United States Patent Office 2,967,578
Patented Jan. 10, 1961

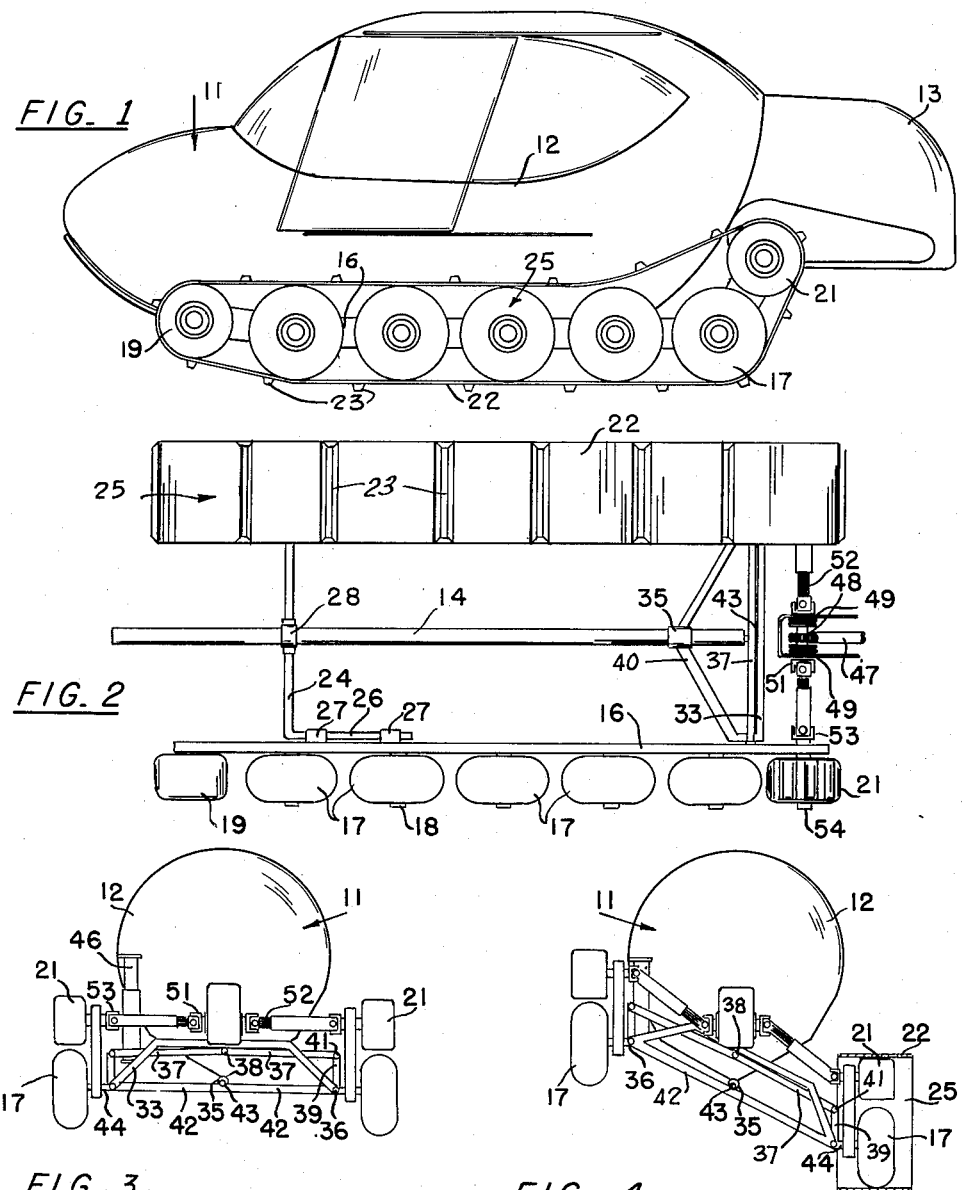

2,967,578
SUSPENSION AND DRIVE MECHANISM FOR ENDLESS TREAD VEHICLES

William H. Schomers, Lakewood, Colo., assignor to The Kristi Co., a corporation of Colorado Filed Mar. 4, 1957, Ser. No. 643,771

5 Claims. (Cl. 180—6.7)

The present invention relates to snow vehicles and, more particularly, to a suspension and drive mechanism for multi-purpose vehicles useful in mountainous and rugged terrain over snow, muddy or dry surfaces.

Previously many different types of vehicles have been designed and built in order to facilitate travel over snow and other difficult surfaces. It is one object of this invention to present improvements in vehicles for such use by adapting and modifying the vehicle suspension system shown in my copending application now on file, Serial No. 569,396, filed March 5, 1956, and since issued as Patent No. 2,905,479, for use with track laying type vehicles.

Another object of the present invention is to provide various means for accomplishing the desirable purpose of providing a vehicle which will readily negotiate the inclines and steep slopes of mountainous and other rugged terrain even though the traction characteristics of the supporting surface are materially reduced by the presence of deep snows or mud.

In satisfaction of the foregoing objects, it is a further object of this invention to provide various types of suspension systems for track laying type vehicles which accomplish the desirable purpose of shifting the center of gravity of the vehicle and altering the position of support traction members.

In further satisfaction of these objectives, it is another purpose of this invention to provide alternate types of drive mechanisms and drive control mechanisms for use with the improved type suspension systems.

Figure 5:
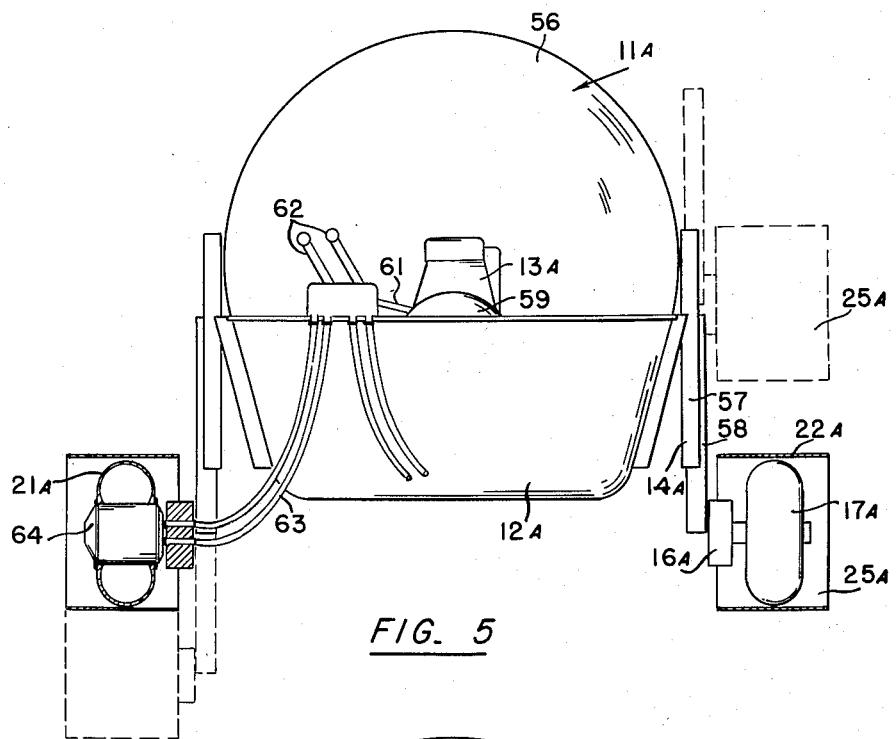
Figure 6:
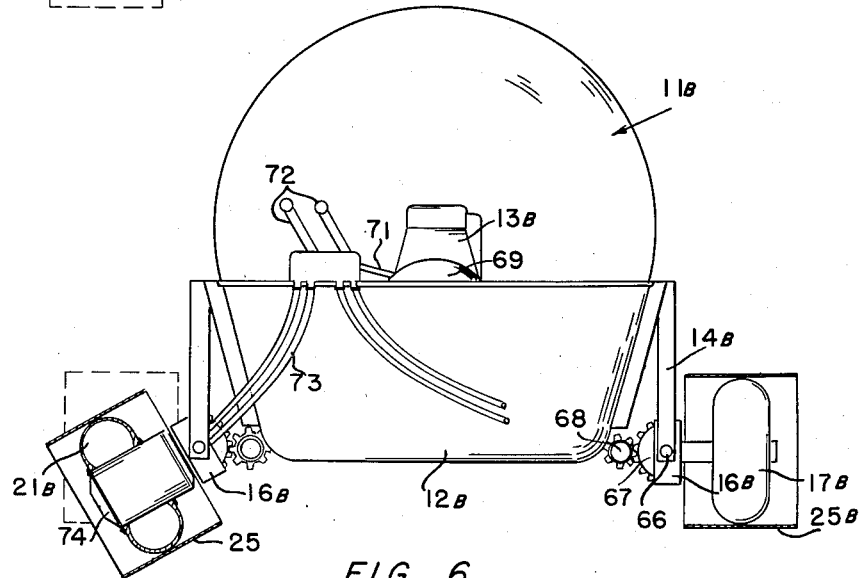

Further objects and advantages of the present invention will be apparent from the appended description and drawings, in which Fig. 1 is a side elevation showing the general features of a vehicle made in accordance with this invention, Fig. 2 is a top view with parts in cross-section and with parts broken away of a first form of suspension system useful in accordance with this invention, Fig. 3 is an end elevation showing further details of the suspension system of Fig. 2, Fig. 4 is an end elevation showing an alternate position for the traction support members previously shown in Figs. 2 and 3, Fig. 5 is an end elevation showing a second form of suspension system, together with a second type of drive and drive control system with parts shown in alternate outline position, and Fig. 6 is an end elevation showing a third form of suspension system and drive and drive control mechanisms with parts shown in alternate outline position.

Briefly stated, the present invention provides various means for raising, lowering or tilting track type traction drive support members with respect to a vehicle frame so that the vehicle can more easily negotiate steep inclined surfaces, such as, side hills of mountainous terrain, snow drifts or the like. In addition to mechanisms for alternately positioning the track drive support members, the invention is also concerned with the provision of a power transmission system which will effectively deliver power selectively to the track drive support mechanisms in all adjusted positions of such track drive support members.

The suspension functions of the system are accomplished through use of a parallelogram type mount similar to that shown in my copending application combined with a torsion bar suspension device or by mechanisms for selectively raising and lowering the track drive support members with respect to the vehicle chassis, or by mechanism for tilting the track drive support members or by other similar means. The drive-power transmission functions of the invention present a special problem because of movement of the ground contacting drive elements with respect to the vehicle and main power unit. Satisfaction of these requirements is accomplished through use of various types of direct connected power transmission elements, such as universal joints or flexible couplings, or by use of remote hydraulic or electrical motors connected to the main power source by flexible conduits.

Referring now to the drawings, the detailed features of separate embodiments of the invention may be more clearly seen and understood.

In the drawings, Figs. 1 through 4 relate to a first preferred embodiment of the invention. In these figures the track mounted vehicle 11 includes a cab body 12 and an engine drive unit 13 connected to a main longitudinal frame member 14. This main longitudinal frame member, as shown in Fig. 2, is pivotally secured to the suspension system for the vehicle so that the cab body 12 and engine 13 are free to rotate with respect to the suspension system. The suspension system, as initially shown in Fig. 2, includes a longitudinal track drive support frame 16 upon which a plurality of idler support wheels 17 are rotatably mounted through use of stub axle and wheel bearing assemblies 18. In addition, a front idler wheel 19 is mounted on the frame member 16, and a rear drive wheel 21 is likewise mounted on an extension of the frame 16. As shown, a track type track member 22 is stretched over the wheels 17, 19 and 21 and is provided with spaced cleats 23 to complete a track drive support unit 25. Adequate traction and flotation for the vehicle 11 is assured by the large area of contact of track 22 and the design of the track drive support unit 25.

A novel feature of the present invention is the provision of means for tilting or raising and lowering the separate track drive support units 25 on opposite sides of the vehicle 11. A first mechanism for accomplishing this desirable purpose is shown in Figs. 2, 3 and 4. In explanation of this system, it should first be noted that the front portion of the track support frame member 16 is secured to a torsion bar unit 24. This torsion bar 24 has a lever extension arm 26 secured to the frame 16 by brackets 27 through which the lever arm 26 extends. Since there must be freedom of motion between the brackets 27 and the lever arm 26, it is preferred that a rubber bushing (not shown), or other type shock device, be included within the brackets 27. The torsion bar 24 is similarly secured to the frame members 16 on opposite sides of the vehicle and is further pivotally secured to the longitudinal body frame member 14 by means of a bearing 28. Accordingly, the frame members 16 on opposite sides of the body frame member 14 may be raised and lowered or pivotally moved with respect to the body frame member 14. It should be noted that while the frame members 16 may be moved to various alternate positions with respect to the body frame member 14, movement of one frame member 16 in an upward position will cause a corresponding movement of the opposite frame member 16 in a downward direction. In addition, if one track drive support unit 25 engages an obstacle in the path of the vehicle, the tendency of that track drive support unit 25 to raise will be resisted both by the vehicle support force exerted by the opposite track drive support unit as transmitted by the torsion bar acting as a simple lever with fulcrum at bearing 28, and likewise by torsion forces set up in the torsion bar 24 through twisting moments induced by displacement of lever arm 26.

While simple mechanism comparable to the torsion bar described will provide the desirable tilting of the track drive support unit 25 to raised and lowered positions, it is also advantageous to maintain the tracks 22 in parallel positions to prevent side-slip of the vehicle when the vehicle is on a steeply inclined hillside. A parallelogram mechanism similar to that shown in my aforementioned copending application satisfactorily and efficiently provides the additional control necessary to assure proper movement of the traction drive support units 25. The elements and function of the parallelogram mount is shown in the same figures. These elements include a rigid truss 33 inclusive of lower outriggers 42 and forwardly extending braces 40 which are pivotally mounted to frame member 14 at the forward pivot bearing 35. This truss 33 provides support for the outer pivot pins 36 of the parallelogram mechanism.

The actual parallelogram mechanism includes the use of upper outriggers 37 pivotally secured to the frame of vehicle 11 by means of a center pin 38. Outriggers 37 are likewise joined to an upright link 39 by pivot pins 41. The lower outrigger members 42 of truss 33 are also pivotally secured to the frame member 14 by a bearing 43. As shown, stub axles 44 extend outwardly from the upright links 39 and are rigidly positioned with respect thereto. Accordingly, when the parallelogram mechanism is tilted as shown in Fig. 4, the relative position of the vehicle 11 and the track drive support unit 25 mounted on the stub axles 44 will be changed to keep the tracks 22 parallel so as to engage the vehicle supporting surface of a side hill at an angle.

In order to move the parallelogram mechanism to the desired positions, a track positioning mechanism is used. In this embodiment such mechanism includes the use of a hydraulic cylinder 46 disposed between the rigid truss 33 and the vehicle frame or cab 12.

With the mechanism described, the track drive support units 25 may be moved to many positions when it is necessary to negotiate steeply inclined surfaces and when the vehicle is on a steep side hill. The combined parallelogram mechanism and torsion bar suspension, as described, will tend to maintain the vehicle cab 12 in vertical or near vertical position thereby enhancing the comfort of the vehicle occupants as well as increasing the ability of the vehicle to maintain its side hill position as a result of the beneficial movement of the center of gravity to a position closer to the side hill.

The beneficial movement and tilting of the traction drive support units 25 accomplished through use of the described mechanism, however, presents another problem inasmuch as power must be transmitted from the engine drive unit 13 selectively to the drive wheels 21 in order to obtain movement of the vehicle along the side hill. A first means for satisfying this requirement would be through the use of direct connected power transmission members. One type of direct connected power system is shown in Figs. 2, 3 and 4, where it will be noted that power from the engine drive unit is transmitted by a shaft 47 to a centrally disposed drive gear 48. This gear delivers power to a unit of a selective drive control mechanism which in the present instance is represented by friction drive clutches 49. When these friction drive clutches are properly energized by a control mechanism, such as clutch actuators (not shown), power from the gear 48 will be delivered through the friction drive clutches 49 to inboard universal joints 51. These universal joints 51 are connected to cooperatively splined extension shafts 52 having mating male and female parts reciprocally engaged one within the other to allow the driving connection between the inboard universal joints 51 and outboard universal joints 53 mounted on stub axles 54 to remain in driving connection with the drive wheels 21. This drive connection allows power to be transmitted from the friction drive clutches 49 to the drive wheels 21 even though such drive wheels are moved to alternate full angled positions as shown in Fig. 4.

When the drive wheels 21 and track drive support units 25 are in the full angle position shown, the vehicle 11 is able to negotiate, park or make turns on steeply inclined side hills. The increased maneuverability of the unit utilizing this combined drive and suspension system and the increased utility of the vehicle makes this type of combined system highly desirable for use under difficult conditions.

Additional systems for attaining these desirable objectives and results are shown briefly in Figs. 5 and 6. In Fig. 5 a type vehicle 11a is shown which utilizes a watertight base frame structure 12a similar in construction to the construction of a boat. A canopy enclosure 56 closes off the top portion to provide an enclosed cab and likewise provides protection for an engine drive unit 13a which is mounted wholly within the frame structure 12a. Frame support members 14a are disposed on opposite sides of the frame structure 12a, and one portion of the frame 14a provides a slide guide channel 57. A slide member 58 is reciprocally received in slide guide 57 for movement to raised and lowered positions with respect to the frame structure 12a. A track drive support frame member 16a is affixed to the lower extremity of the slide 58, and, as in the previous embodiment, a plurality of stub axles provide support for support wheels 17a. As in the previous embodiment, these wheels 17a coact with additional drive wheels and idlers to provide guiding support for a track 22a of a track drive support unit 25a. With this type structure, it is obvious that the support units 25a may be moved to alternate positions corresponding with the alternate positions shown.

In this same illustration a separate type of drive power transmission system is shown. In this embodiment a hydraulic pump represented at 59 is direct connected to the engine drive unit 13a, and hydraulic fluid under pressure is delivered by means of conduits 61 to a selective drive control unit 62, which in actuality would be a flow regulating valve unit, as shown. This valve control unit 62 is connected by means of conduits 63 to a hydraulic motor 64 mounted coaxially and in driving relation with the drive wheel 21a. Since the conduits 63 may be made of flexible materials, hydraulic fluid under pressure may be conveyed through these power transmission conduits 63 to the traction drive support units 25a irrespective of the positioning of such units.

A third type of suspension system is shown combined with another type of drive and drive control system in Fig. 6. In this figure the vehicle 11b is of similar structure to that shown in Fig. 5 and is likewise provided with a watertight base frame structure 12b, which will, together with the pneumatic wheels 17b, keep the entire unit afloat even when crossing streams or lakes and the like. As in the previous embodiment, an engine drive unit 13b is mounted within the base frame structure 12b and frame members 14b are affixed to opposite sides of the base frame to provide support for the track drive support units 25b. In this embodiment of the invention the frame 14b provides pivotal support at pivot 66 for the longitudinal support frame 16b, so that this entire frame together with the support wheels 17b and other wheels may be pivoted about a longitudinal axis. Further, a segment rack 67 is affixed to the frame 16b in mating contact with a drive pinion 68 so that power applied to the drive pinion 68 will cause rotation of the frame 16b about pivot axis 66. As the frame 16b is rotated, the support wheels 17b and drive wheel 21b will likewise be rotated together with their respective axles, and if both the frames 16b are rotated to cooperative positions corresponding with the positioning of the traction drive support unit 25b shown at the left of the illustration, the vehicle will be able to maintain itself on steeply inclined side hills. However, it should be noted that rotation of the track drive support unit 25b in this embodiment does not effect a corresponding movement of the vehicle itself. Accordingly, it is doubtful if this unit would be able to negotiate as steeply inclined side hills as the previously described units.

The drive and drive control system for this embodiment of the invention would include the use of an engine driven generator 69 connected by cables 71 to a drive control mechanism 72, which in actuality would be a system of switches, relay switches or combined switches and rheostats to deliver regulated power through flexible conduit 73 to electric drive motor 74 mounted coaxially with the drive wheels 21b. As in the previous embodiment, the use of flexible conduit 73 would insure proper transmission to the drive wheels 21b irrespective of the position of the track drive support units 25b. Further, for this type of combined unit electrical power could be used for rotation of the pinion 68 to selectively position segment gear 67 and the longitudinal frame support 16b.

While separate embodiments of the invention have been shown and described, it is apparent that other types of suspension and drive systems may be adapted to the beneficial purposes herein described. It will further be apparent that while specific types of drive systems have been shown in this application in connection with other specific suspension systems, that all such suspension systems and drive systems are mutually interchangeable so that many further combinations of these systems are possible. All such modifications, changes, adaptations or improvements of the herein disclosed invention as are covered by the appended claims are deemed to be a part of this invention.

What is claimed is:

1. Suspension and drive mechanism for track laying vehicles adapted to increase the ability of such vehicles to negotiate difficult terrain inclusive of steeply sloping side hills, comprising a main base frame for said vehicle, support facilities for a passenger-operator on said base frame, track drive support frames extending along and disposed on opposite sides of said vehicle, lever means at the front and back ends of said base frame pivotally connected to said vehicle base frame, rotative members on each of said track drive support frames inclusive of at least one drive wheel and a plurality of idler wheel members, and endless track disposed about said rotative members and movable therewith for the transmission of vehicle drive forces received from said drive wheel to the supporting ground, means pivotally interconnecting the lever means at the front end of said base frame to said track drive support frames to provide a front lever suspension system, means pivotally interconnecting the lever means at the back end of said base frame to said track drive support frames to provide a back lever suspension system, power means for moving one of said lever suspension systems to adjusted angular positions with respect to said base frame, said movements through the interaction of said track drive support frames being effective to move the other of said lever suspension systems to a corresponding position whereby said track drive support frames and the endless tracks thereon may be placed in relative parallel positions one above the other along an inclined supporting surface with the inside track edge disposed at an angle with respect to said surface for increasing the support characteristics of said vehicle and for increased freedom from slipping, an engine drive unit supported by said base frame, power transmission members connecting said engine drive unit and the drive wheel of said track drive support unit in all alternate adjusted positions of said support unit, and drive control members for selectively regulating the power delivered to the drive wheels on each of said track drive support frames.

2. Suspension and drive mechanism for track laying vehicles adapted to increase the ability of such vehicles to negotiate difficult terrain inclusive of steeply sloping side hills, comprising a main base frame for said vehicle, support facilities for a passenger-operator on said base frame, track drive support frames extending along and disposed on opposite sides of said vehicle, lever means at the front and back ends of said base frame pivotally connected to said vehicle base frame, rotative members on each of said track drive support frames inclusive of at least one drive wheel and a plurality of idler wheel members, an endless track disposed about said rotative members and movable therewith for the transmission of vehicle drive forces received from said drive wheel to the supporting ground, means pivotally interconnecting the lever means at the front end of said base frame to said track drive support frames to provide a front lever suspension system, means pivotally interconnecting the lever means at the back end of said base frame to said track drive support frames to provide a back lever suspension system, power means for moving one of said lever suspension systems to adjusted angular positions with respect to said base frame, said movements through the interaction of said track drive support frames being effective to move the other of said lever suspension systems to a corresponding position whereby said track drive support frames and the endless tracks thereon may be placed in relative parallel positions one above the other along an inclined supporting surface with the inside track edge disposed at an angle with respect to said surface and with the bottom surface of the track maintained at all times perpendicular to an axis passing vertically through said base frame and vehicle for increasing the support characteristics of said vehicle and for increased freedom from slipping, an engine drive unit supported by said base frame, and power transmission members connecting said engine drive unit and the drive wheel of said track drive support unit in all alternate adjusted positions of said support unit.

3. Structure in accordance with claim 1 wherein the lever suspension system at one end of said base frame includes a parallelogram mechanism pivotally connected to said base frame and said track drive support frames.

4. Structure in accordance with claim 1 wherein said drive control members are inclusive of separate drive clutches connected to said engine drive unit, and wherein said power transmission members are inclusive of a direct connected positive drive element between said drive clutches and the drive wheel of said track drive support frame.

5. Structure in accordance with claim 1 wherein the lever suspension system at one end of said base frame comprises a parallelogram mechanism pivotally interconnected to said base frame and said track drive support frames and wherein the lever suspension system for the opposite end of said base frame comprises a torsion bar member pivotally secured to said base frame and to said track drive support frames.

References Cited in the file of this patent

UNITED STATES PATENTS

| 1,348,333 | Swan | Aug. 3, 1920 |
| 2,434,693 | Graham | Jan. 20, 1948 |

FOREIGN PATENTS

| 930,390 | France | Aug. 4, 1947 |
| 293,900 | Italy | Mar. 5, 1932 |